United States Patent [19]

Shinoda et al.

[11] Patent Number: 5,653,082

[45] Date of Patent: Aug. 5, 1997

[54] METHOD OF MANUFACTURE OF A CONCRETE-FILLED STEEL BEARING WALL

[75] Inventors: Taizo Shinoda; Yutaka Okuda, both of Kobe; Hisashi Sekimoto, Takasago; Shigeyuki Akimoto, Kobe; Eiji Kokubo, Kobe; Kazuo Nakanishi, Kobe; Tadafumi Asamura, Tokyo; Akio Yabuuchi, Tokyo; Ippei Matsuo, Tokyo; Kiyoshi Hara, Tokyo, all of Japan

[73] Assignees: Mitsubishi Jukogyo Kabushiki Kaisha; Kajima Corporation, both of Tokyo, Japan

[21] Appl. No.: 502,143

[22] Filed: Jul. 13, 1995

Related U.S. Application Data

[62] Division of Ser. No. 387,356, Feb. 13, 1995, which is a continuation of Ser. No. 928,482, Aug. 12, 1992, abandoned.

[30] Foreign Application Priority Data

Aug. 13, 1991 [JP] Japan .................. 3-202963
Aug. 13, 1991 [JP] Japan .................. 3-202964
Aug. 13, 1991 [JP] Japan .................. 3-202965

[51] Int. Cl.⁶ .................. E04B 1/16; E04B 1/30; E04B 2/86
[52] U.S. Cl. .................. 52/742.14; 52/741.13; 52/742.15; 52/745.19; 52/414; 52/426; 264/261
[58] Field of Search .................. 52/742.14, 742.15, 52/745.19, 250, 309.11, 309.12, 167.1, 334, 378, 237 S, 414, 415, 424–426, 431, 432, 785, 741.13; 264/259, 261

[56] References Cited

U.S. PATENT DOCUMENTS

2,050,290 8/1936 Earley et al. .................. 52/583 X (List continued on next page.)

FOREIGN PATENT DOCUMENTS

| 60-47140 | 8/1983 | Japan . |
| 60-47140 | 3/1985 | Japan . |
| 61-254727 | 5/1985 | Japan . |
| 61-254727 | 11/1986 | Japan . |
| 0063264 | 8/1913 | Switzerland . |
| 1413330 | 11/1975 | United Kingdom . |

OTHER PUBLICATIONS

1/10th Scale Model Test of Inner Concrete Structure Composed of Concrete Filled Steel Bearing Wall (article) pp. 73–78.

Feasibility Study of Concrete Filled Steel (SC) Structure for Reactor Building (article) pp. 67–72.

A Compression and Shear Loading Test of Concrete Filled Steel Bearing Wall (article) pp. 323–328.

Primary Examiner—Robert Canfield
Attorney, Agent, or Firm—Jacobson, Price, Holman & Stern, PLLC

[57] ABSTRACT

Disclosed is a concrete-filled steel bearing earthquake resistant wall which shows combined resistance to shearing forces exerted in the surface plane of an earthquake resistant wall. The wall comprises connecting members 1, a pair of surface steel plates 2 and 2' which are arranged in a parallel relationship to each other and secured by the connecting members 1 so that each space between these surface steel plates 2 is filled with the wall unit concrete 7, and wall unit periphery binding steel reinforcements 8 constructed from inverted U-shaped steel bars or similar material and arranged along the peripheral part of the wall unit concrete 7 at predetermined intervals so as to be fixed to said concrete 7. In addition, the slippage preventing members 6 are arranged in a staggered arrangement on the aforementioned surface steel plates 2 and 2'. Finally, belt-shaped steel members 11 are attached to the top of the connecting members 1 which are planted on one side of the surface steel plates 2, and the other surface steel plate members 2' are connected by plug welding to said belt-shaped steel members 11.

2 Claims, 12 Drawing Sheets

U.S. PATENT DOCUMENTS

| | | | |
|---|---|---|---|
| 2,412,253 | 12/1946 | Diggs | 52/426 X |
| 3,186,131 | 6/1965 | Denny et al. | 52/426 |
| 4,018,055 | 4/1977 | LeClercq | 52/742.14 X |
| 4,038,793 | 8/1977 | Roca | 52/583 X |
| 4,133,156 | 1/1979 | Unger | 52/426 X |
| 4,433,520 | 2/1984 | Maschhoff | 52/426 X |
| 4,594,830 | 6/1986 | Matz et al. | 52/334 |
| 4,676,035 | 6/1987 | Gangarao | 52/583 X |
| 4,934,121 | 6/1990 | Zimmerman | 52/583 |
| 4,936,540 | 6/1990 | Boeschart | 52/426 X |
| 5,092,093 | 3/1992 | Lu | 52/426 |
| 5,131,201 | 7/1992 | Larson et al. | 52/583 |
| 5,140,794 | 8/1992 | Miller | 52/309.12 |

…

METHOD OF MANUFACTURE OF A CONCRETE-FILLED STEEL BEARING WALL

This is a divisional of application Ser. No. 08/387,356 filed Feb. 13, 1995, which is a continuation of prior application Ser. No. 07/928,482, filed Aug. 12, 1992 now abandoned.

FIELD OF THE INVENTION AND RELATED ART STATEMENT

This invention relates to a concrete-filled steel bearing wall and a method of manufacture thereof which are applicable to construction of concrete-filled steel bearing wall structures used in the construction of, for example, facilities related to nuclear power generation. To be more precise, it relates to a concrete-filled steel bearing wall comprising a pair of steel plates which faces each other and are arranged in parallel with each other at a given distance, and concrete filled between these steel plates; namely, a so-called SC structure and a method of production thereof.

Reinforced concrete structures and steel framed reinforced concrete structures have been used in the construction field for a very long time.

However, fabrication involving concrete has to be done after such structures are assembled at a construction site from reinforced steel and steel framed reinforced steel structures. A problem here is that the time period required for construction tends to be long. To cope with this problem, so-called SC structures which use composite structures of steel plates and concrete are widely used.

To put it simply, these structures include pairs of steel plates facing each other and linked with connecting members, such as steel web plates and steel rods, the spaces between the steel plates are filled with concrete, and a plurality of stud bolts are planted on the facing sides of the steel plates, so as to prevent a discrepancy from occurring between the steel plates and the concrete filled.

Since the construction of such structures Which includes the assembly of steel plates or the like and concrete filling and other operations, could be done at plants equipped with facilities for these operations, it has become possible to greatly reduce the number of work days that has to be spent at construction sites and that tends to increase depending on weather conditions and other factors.

The walls used in these SC structures have conventionally been assembled according to the following procedures.

In a first such method shown in FIGS. 1a and 1B, connecting members having a length which is equal to the thickness of the concrete-filled steel bearing wall are connected by direct welding or by a similar method to one surface steel plate 2 of a pair of the surface steel plates 2, 2'. In a second method shown in FIGS. 2a and 2b, members 1 and 1' whose length is about a half of the thickness of the concrete-filled steel bearing wall are erected on the opposing surfaces of the two surface plates 2, 2'. Then the connecting members 1 and 1' are then joined using a splice plate 3 and a bolt 4. According to a third method shown in FIGS. 3a and 3b, one end of a connecting member 1 which is slightly longer than the thickness of the concrete-filled steel bearing wall is formed into a screw, and the connecting member 1 is joined in advance at the other end to the surface of the steel plate 2' by welding by or a similar method, so that the screw portion of the connecting member penetrates through an opening in the surface plate 2, and then the steel structure is assembled by fastening nuts 5 to the screw and tightening the structure.

Then, irrespective of which methods being used, the space between the two facing surfaces 2 and 2' is filled with concrete.

In FIGS. 1a to 3b, numeral 6 indicates stud bolts 6 which are in advance planted to the facing surfaces of the steel plates 2 and 2'.

Although it is possible to use the thus produced concrete-filled steel bearing walls simply as walls, it is more effective to use them as composite structural members which also function as load-bearing members, such as pillars and supporting frames, in RC structures and SFRC structures. In this case, a large compression or shearing load is exerted on the wall surfaces. It is well known to those skilled in the art that concrete is weak against tensile forces, while it is strong against compression forces and bears compression loads.

Since concrete-filled steel bearing walls has a composite structure, the steel plates also bear the compression and shearing loads. A concrete-filled steel bearing wall is designed so that, of these two kinds of load, the shearing load is borne only by the steel plates. In any case, it is necessary to prevent the buckling of the above mentioned steel plates. Also, since the transfer of force in the space between the filled concrete and the surface of the steel plate occurs primarily through the stud bolts 6, the arrangement of these stud bolts is very important in dealing with the buckling of the surface steel plate.

In other words, stud bolts 6 fixed onto the surface steel plate 2 and 2' of the concrete-filled steel bearing walls are arranged in a square arrangement (FIGS. 4 and 5) in longitudinal and transverse directions according to conventional art. The most dominant forces which act on this type of structures are seismic forces. In a schematic drawing shown as FIG. 8, the hatched wall W receives a compressive force when the seismic force is in a direction perpendicular to the wall W, i.e, the x-axis direction, and it receives a shearing force when the seismic force occurs in the y-axis direction, which is parallel to the wall. In view of these forces, the intervals between the stud bolts are determined so as not to allow compression buckling or shear buckling to occur in the surface steel plates.

In such a conventional method as one shown in FIGS. 6 and 7, as indicated by hatching, the area B on the steel plate 2 which is surrounded by two rows of stud bolts 6 is regarded as an indefinitely long plater and the intervals between the stud bolts 6 are determined so that the steel plate 2 does not buckle. With this design, because intervals between the stud bolts in the direction of main compression are made small so that the steel plate does not buckle with compression load, buckling due to shearing load does not occur as a matter of course.

Although the SC structures mentioned above were very effective in reducing time periods required for the construction of buildings, in order to broaden application areas and make them more practical, it is necessary to create a design that would greatly reduce the amount of materials used, make manufacture easier, simplify their structure, and increase their strength.

For example, according to conventional construction methods, the stud bolts are arranged in square (square arrangement), but since in this case there exits an imbalance between the compression buckling load and the shear buckling load, the strength against shearing is excessive.

In addition, the shearing load is borne basically by the surface plates, and their thickness is large. However, the characteristics of concrete material are not sufficiently utilized because the load supporting capacity of filled concrete may not be utilized.

In other words, it is necessary to realize a less expensive SC construction by letting the filled concrete bear some of the shearing load.

In order to provide a rationalized SC construction which would resolve the problems described above, it is necessary to improve the method of manufacture (manufacturing processes) of such structures.

According to conventional methods shown in FIGS. 1 and 2, a connecting member 1 has to be welded to the inner surface of the opposing surface steel plate 2, and connecting members 1 have to be connected with each other through splice plates 3. These manufacturing steps have to be carried out by a worker, and a sufficient space for this purpose is not available if the walls are thin.

Furthermore, a method which uses bolts and nuts, as shown in FIG. 3, requires accurate positioning of openings required for bolts and accurate welding of the connecting members, so that high cost is unavoidable. Finally, since the nuts protrude out of the surface of the surface plate, not only is the appearance of the walls poor, but such an arrangement can also easily be an obstacle to mounting other in-building devices or equipment on the surface of the wall.

OBJECT AND SUMMARY OF THE INVENTION

A first object of this invention is to provide a concrete-filled steel bearing wall which is characterized by excellent resistance to earthquakes.

To attain the first object mentioned above, this invention provides a concrete-filled steel bearing wall in which a pair of surface steel plates disposed in parallel with each other are secured by connecting members, and concrete is filled in a space formed between the surface steel plates, said wall being characterized in that reinforcing bars for binding the circumference of a wall body are disposed at predetermined intervals along the circumferential part of the wall body concrete, and said reinforcing bars are fixed to the concrete.

As described above, in the wall structure of the present invention, because wall unit circumference binding steel reinforcements are arranged along the circumference of the wall body concrete filled in the space formed between the surface steel plates, when the concrete also bears a shearing force which acts on the wall plane of the earthquake resistant wall, reactive forces which occur near the circumference of the wall along with cracks and fissures occurring in the concrete are transmitted as tensile force to the reinforcing bars arranged at predetermined intervals around the wall circumference.

Moreover, because these reinforcing bars are also fixed to the wall body concrete of this earthquake resistant wall and do not break loose, the tensile force exerted on the reinforcing bars passes through the wall body concrete and is transferred to the wall surface plates of the wall unit, so that a state of stress closure is created, which permits the binding of the circumference of the wall. As a result of that, a combined strength of the wall body concrete and the surface steel plates is secured in this earthquake resistant wall.

A second object of this invention is to provide a concrete-filled steel bearing wall with a rationalized structure, and more specifically, a concrete-filled steel bearing wall that is lightweight and has high strength (offering a high compression buckling load and a shear buckling load).

To attain the second object of this invention, in the concrete-filled steel bearing wall of the invention, individual stud bolts are planted on opposing surfaces, connecting members connect a pair of facing surface steel plates arranged in parallel to each other, empty spaces formed by these surface steel plates are filled with concrete to form a concrete-filled steel bearing wall, wherein the aforementioned stud bolts form a staggered arrangement on the surface steel plates.

According to this invention, stud bolts are arranged in a staggered arrangement (a triangular arrangement) within the vertical and horizontal rows of these stud bolts. Because buckling due to compression load occurs at portions of the steel plates surrounded by two upper and lower neighboring rows of stud bolts, resistance to compression buckling is not substantially changed even when the number of stud bolts planted on the surface steel plates is reduced to form a staggered arrangement, as compared to the grid arrangement (a square arrangement) used in conventional designs.

Furthermore, when buckling occurs due to shearing load at portions of the steel plates surrounded by rows of stud bolts neighboring in the horizontal direction and extending at an angle of 45° with respect to a horizontal line, resistance to shear buckling which is equivalent to compression buckling is provided because the length of shear buckling in the plate is considered to be approximately $\sqrt{2}$ times larger.

A third object of this invention is to provide a method for manufacturing the aforementioned steel bearing wall at a low cost and in a simple manner.

To attain the third object mentioned above, according to the method of manufacture of the concrete-filled steel bearing wall of this invention, a connecting unit made of steel is manufactured by connecting a plurality of connecting rods at one end to a belt-shaped steel plate and by connecting the other end to one plate of the pair of surface steel plates mentioned above; and next, the belt-shaped plate member of the unit and the other one surface steel plate of the pair mentioned above are piled up on top of the other and welded together by plug welding; and then the internal part between the two surface steel plates is filled with concrete.

As described above, this invention uses a plurality of connecting rods connected at one end to a bell-shaped steel plate, while the other end is connected to one surface steel plate of the aforementioned pair of surface steel plates to manufacture connecting units made of steel. These belt-shaped plate member units are piled up on top of the other surface steel plate of the aforementioned pair, and they are plug welded together from the outer side of these surface steel plates. Therefore, the two surface steel plates mentioned above can be connected together without requiring a work space for connecting operations between the plates. Thus, it becomes possible to provide a concrete-filled steel bearing wall having a sufficient thickness of members and having a good external appearance of the wall at the same time.

DETAILED DESCRIPTION OF PREFERRED EMBODIMENTS

Figure 1A:
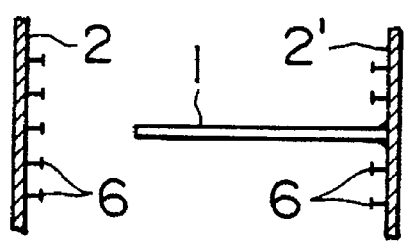
FIGS. 1(a) and (b) provide a plan view showing an example of the process of welding a connecting member to a surface steel plate according to conventional art.
Figure 1B:
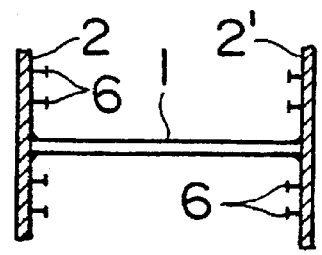
Figure 2A:
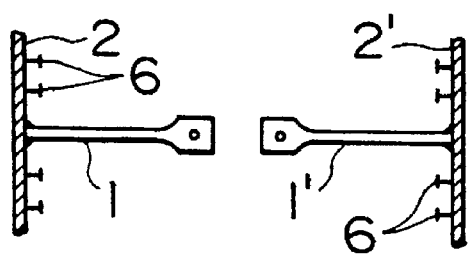
FIGS. 2(a) and (b) provide a plan view showing another example of the process of welding a connecting member to a surface steel plate according to conventional art.
Figure 2B:
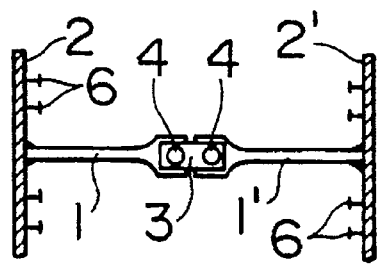
Figure 3A:
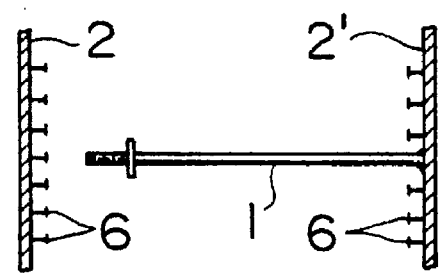
FIGS. 3(a) and (b) provide a plan view showing still another example of the process of welding a connecting member to a surface steel plate according to conventional art.
Figure 3B:
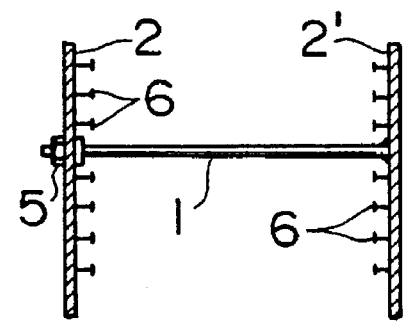
Figure 4:
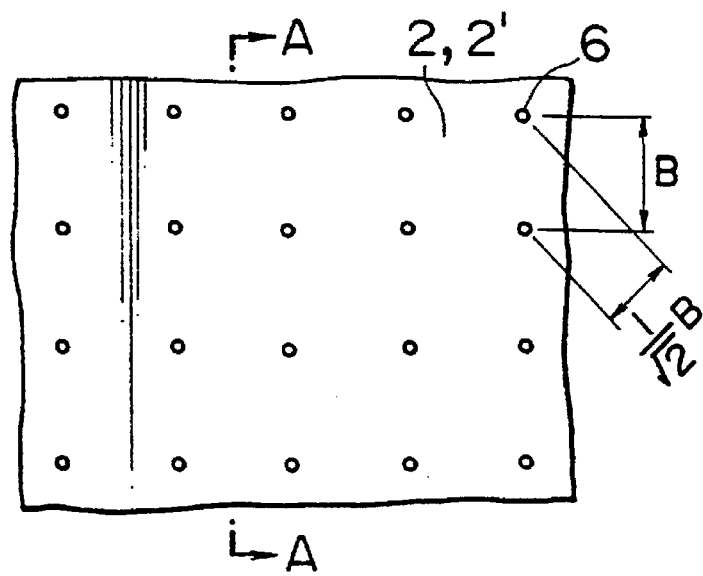
FIG. 4 is a front view showing the arrangement of stud bolts on the surface steel plat of a concrete-filled steel bearing wall according to conventional art.
Figure 5:
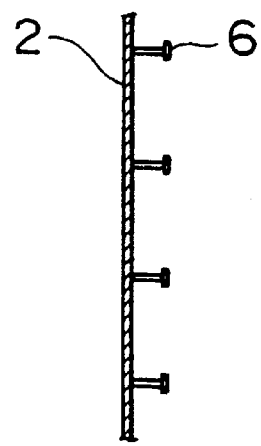
FIG. 5 shows a section seen in the direction of arrows along A—A in FIG. 4.
Figure 6:
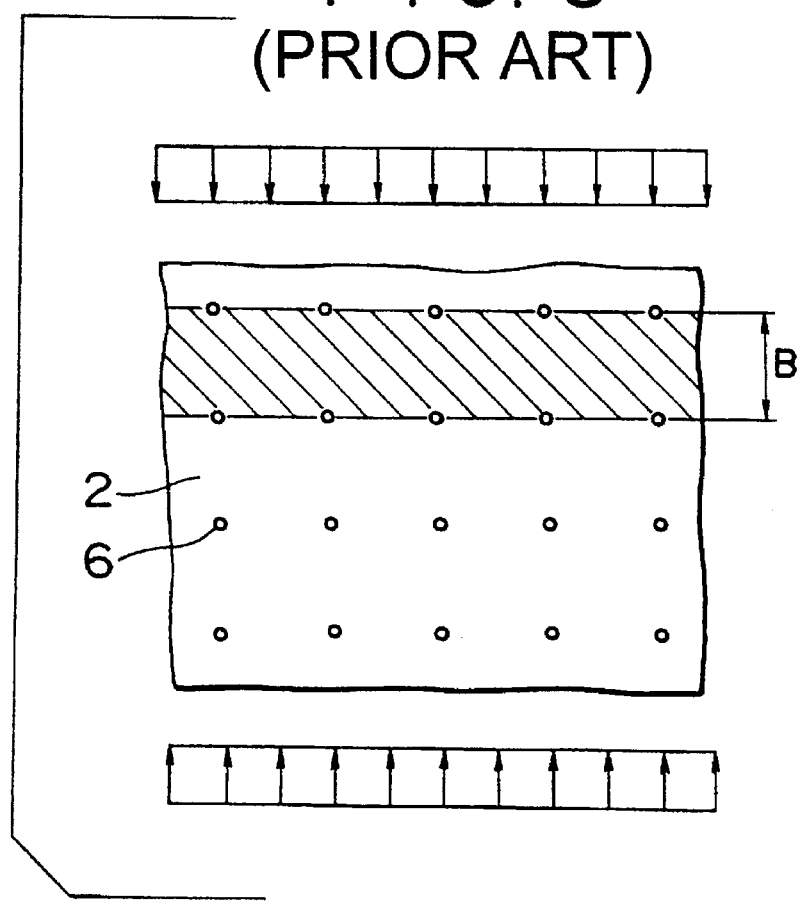
FIG. 6 is a front view showing the length of compression buckling of a surface steel plate in a construction according to conventional art.
Figure 7:
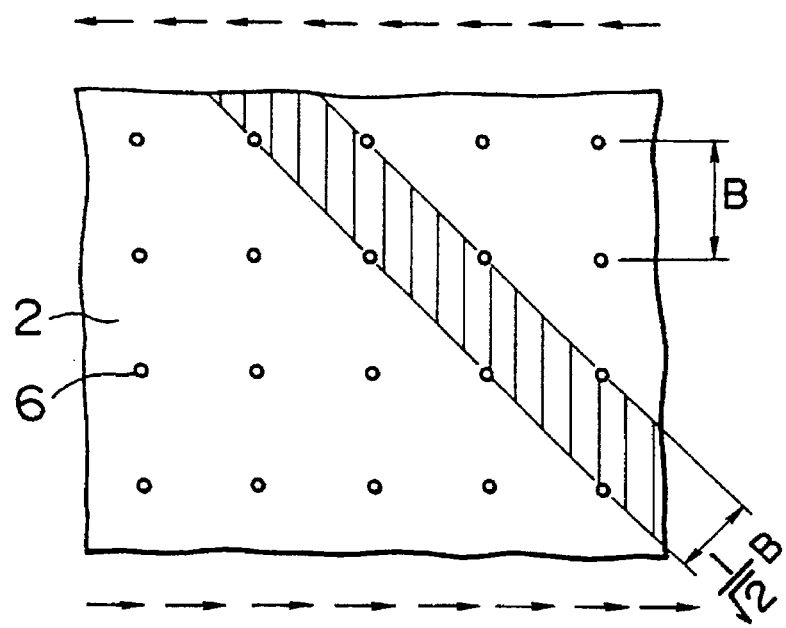
FIG. 7 is a front view showing the length of shear buckling of surface steel plate according to conventional art.
Figure 8:
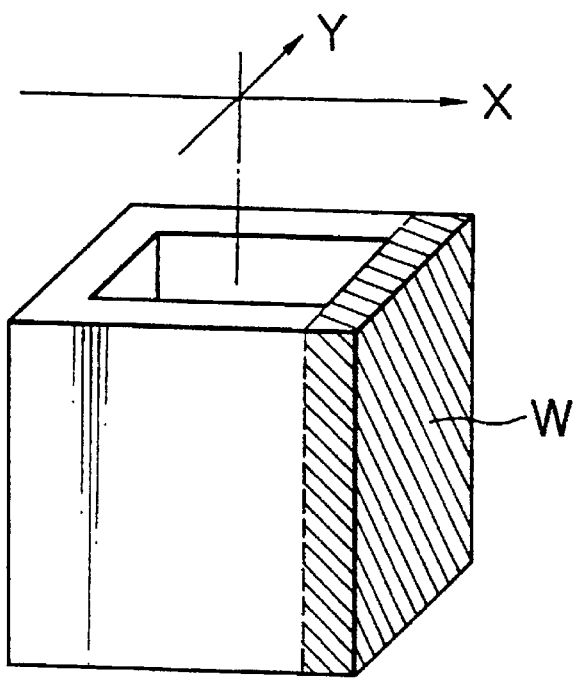
FIG. 8 shows how load acts on a generic structure.
Figure 9:
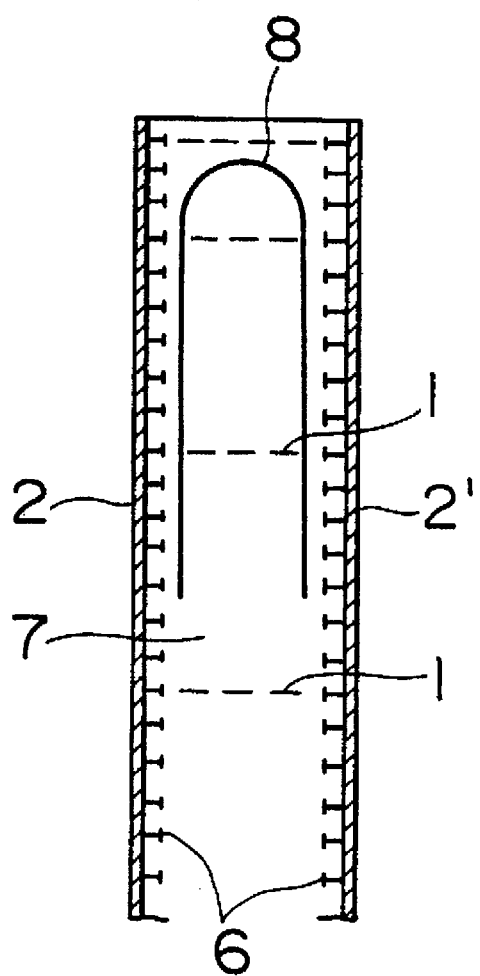
FIG. 9 is a partial cross-sectional view showing one embodiment of an earthquake resistant concrete-filled steel bearing wall according to this invention.

In FIG. 9, a number of stud bolts 6 for preventing slippage are planted on the facing surfaces (internal surfaces) of a pair of parallel surface steel plates 2, and these surface steel plates are connected with each other by connecting members 1 which are disposed at suitable intervals. The arrangement of stud bolts 6 and the method of mounting connecting members 1 will be described later. The space between the surface steel plates 2 is filled with concrete, and iron bars 8 which are shaped like an inverted U letter and which serve as steel reinforcements (reinforcing bars) for restraining the periphery of the wall are embedded along the upper edge of the earthquake resistant wall.

The length of attachment of the inverted U-shaped iron bars is determined by the amount of length required to prevent slippage under the influence of tensile force exerted on steel reinforcements 8. In addition, intervals between the steel reinforcements are determined so as to allow resistance sufficient to prevent falling or other problems under the influence of tensile force.

Figure 10:
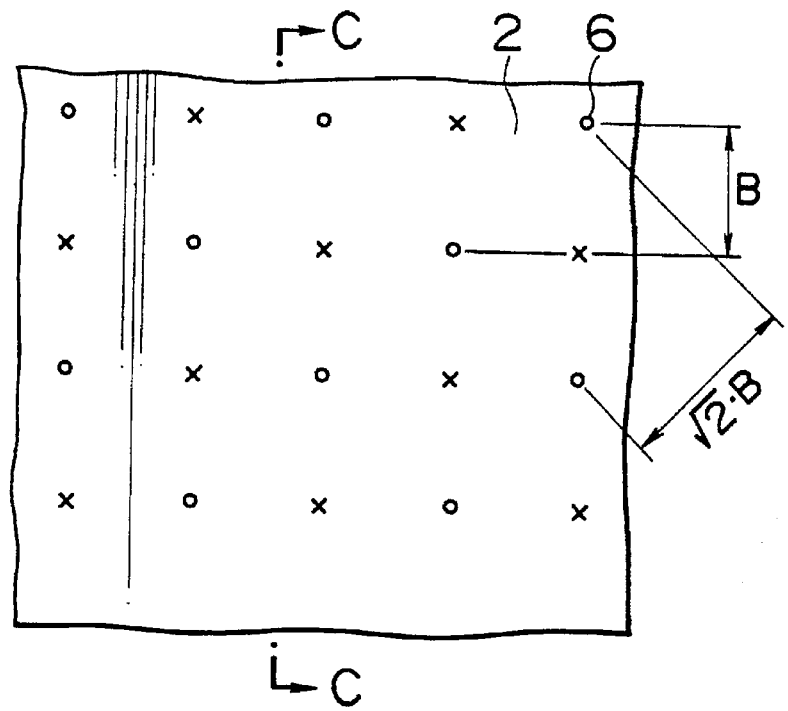
FIG. 10 is a front view showing an arrangement of stud bolts on a surface steel plate of an embodiment of the concrete-filled steel bearing wall according to this invention.
Figure 11:
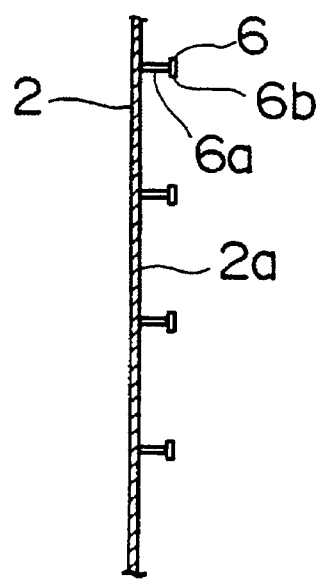
FIG. 11 shows the section indicated by arrows between letters C—C in FIG. 4.

FIGS. 10 and 11 show the stud bolts 6 arranged in a staggered pitch arrangement. The tip of the axial part 6a of the stud bolt 6 is fixed to an inner surface 2a (one of surfaces facing to each other) of the surface steel plates 2 by welding, and its head 6b is embedded in the filling concrete 7.

Furthermore, the X marks shown in FIG. 10 indicate the positions of stud bolts 6 used in a square arrangement according to conventional art, but not used in this invention. As is clear from FIG. 10, the number of stud bolts used according to this invention is reduced by half.

Figure 12:
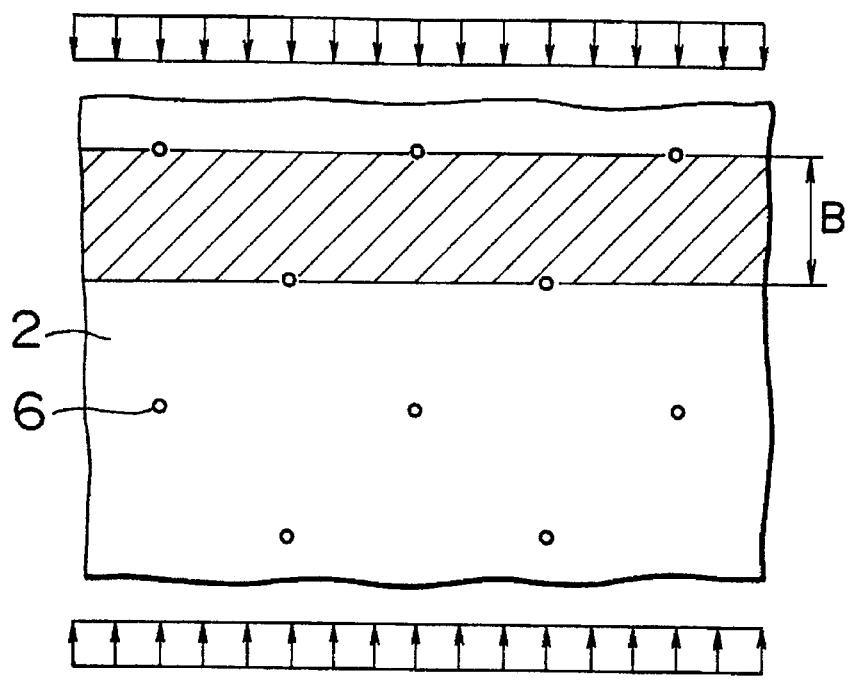
FIG. 12 is a front view showing the length of compression buckling of a surface steel plate in a concrete-filled steel bearing wall according to this invention.

FIG. 12 shows how one can interpret the occurrence of buckling when compression load acts on the internal surface of the wall. Since the surface steel plates 2 are supported by being connected to filling concrete with stud bolts 6, one can consider compression buckling of a hypothetical steel plate having a width B (as indicated by hatching). Even when the arrangement of the stud bolts 6 is changed from a square arrangement to a triangular arrangement, the compression buckling load does not change if the length B for compression buckling remains unchanged.

Figure 13:
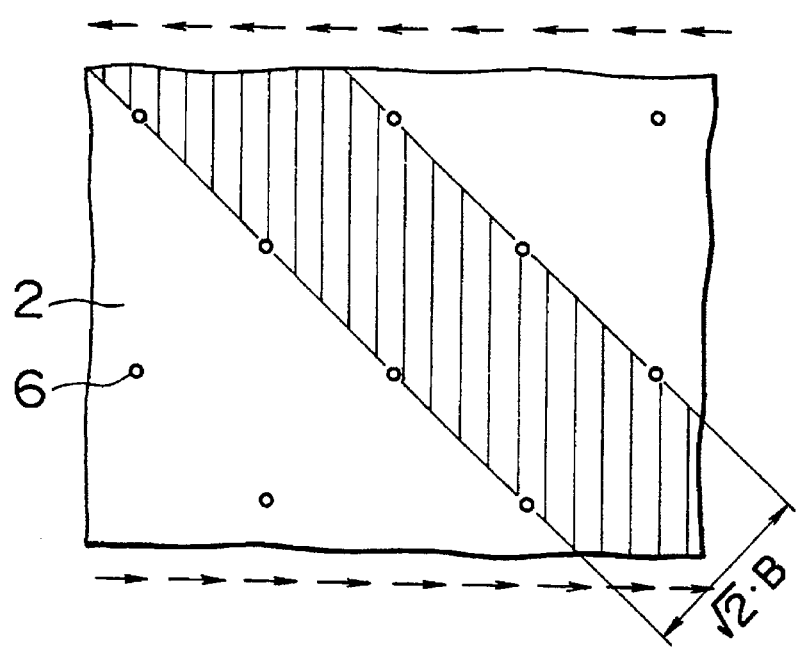
FIG. 13 is a front view showing the length of shear buckling of a surface steel plate of the aforementioned concrete-filled steel bearing wall.

FIG. 13 shows how one can interpret the occurrence of buckling when shearing lead is applied to the internal surface of the wall. Since one can assume that shearing load is exerted onto a hypothetical steel plate having a width of $\sqrt{2} \cdot B$ in the direction shown in the figure, the length for the shear buckling of the plate is $\sqrt{2}$ times larger, and it is possible to obtain shear buckling load which is equivalent to the aforementioned compression buckling load.

Figure 14:
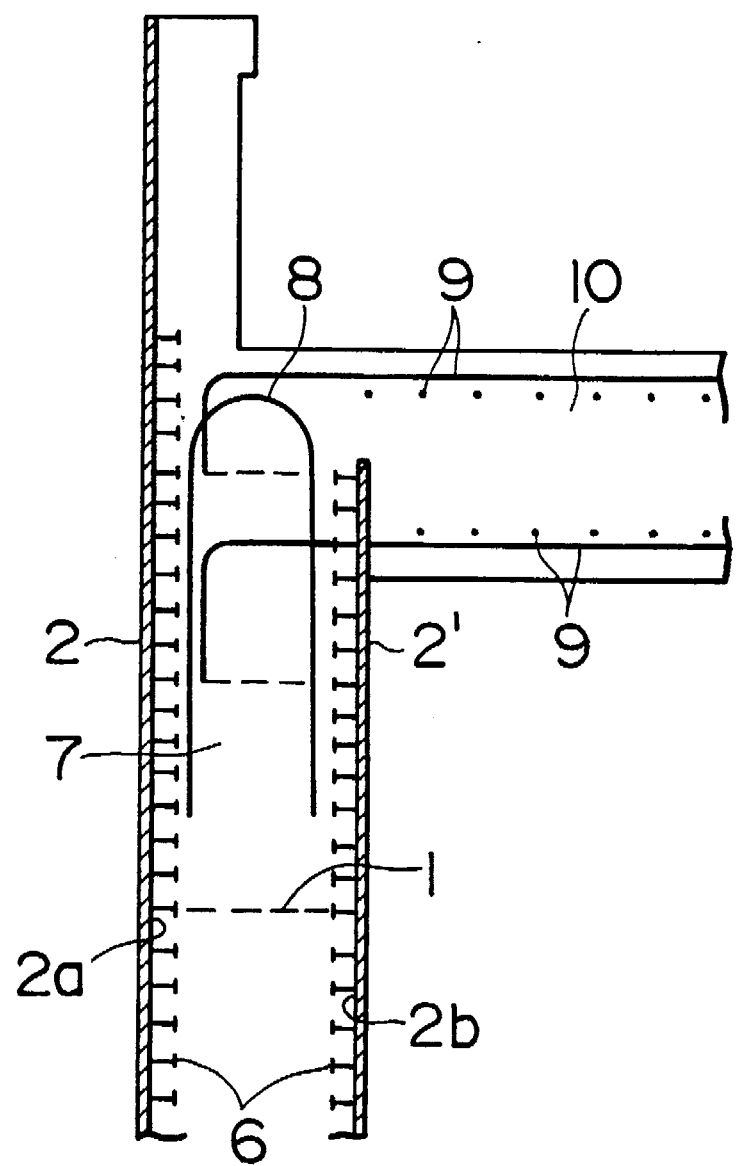
FIG. 14 is a vertical cross-sectional view showing the layout of a portion where the aforementioned earthquake resistant wall meets the bottom slab around the periphery of the top floor of a building.
Figure 15:
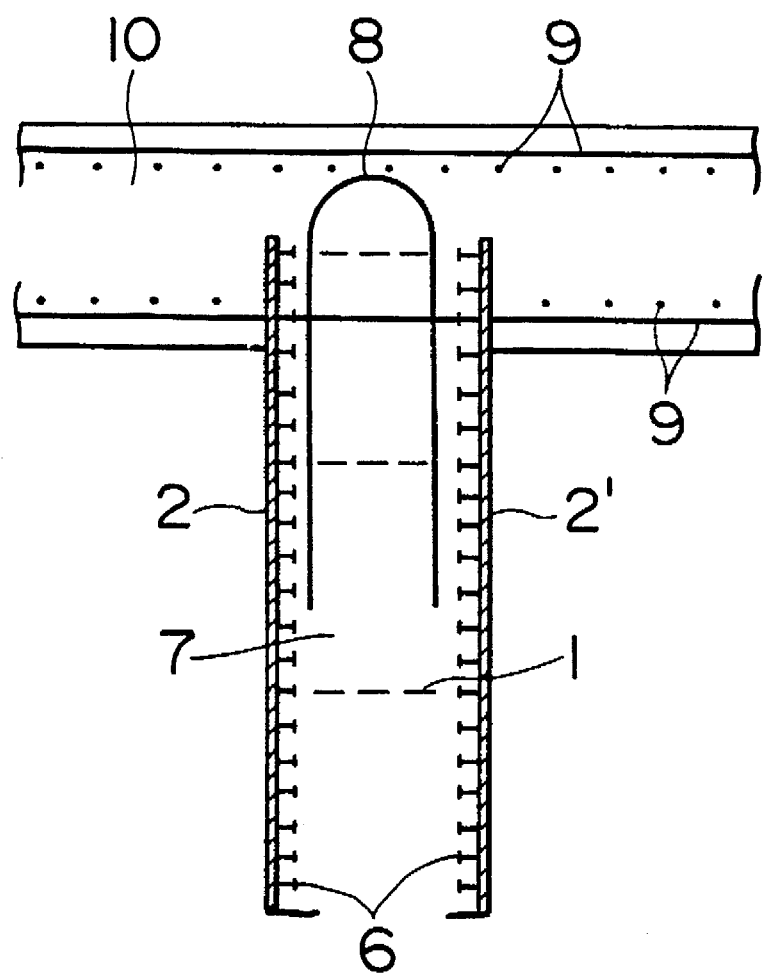
FIG. 15 is a vertical cross-sectional view showing the layout of a portion where the aforementioned earthquake resistant wall meets the bottom slab around the periphery of the top floor of a building.
Figure 16A:
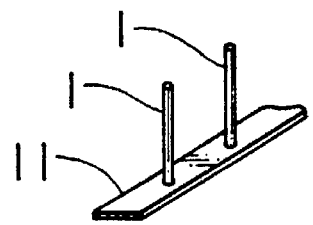
FIGS. 16(a), (b), (c), and (d) provide a perspective view of one embodiment of the method of manufacture of the concrete-filled steel bearing wall according to this invention.
Figure 16B:
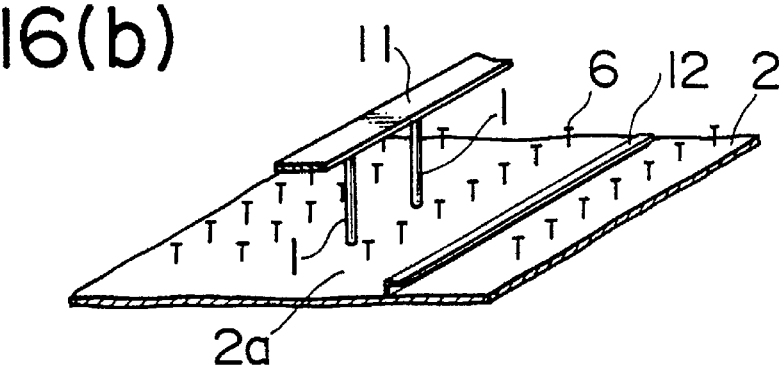
Figure 16C:
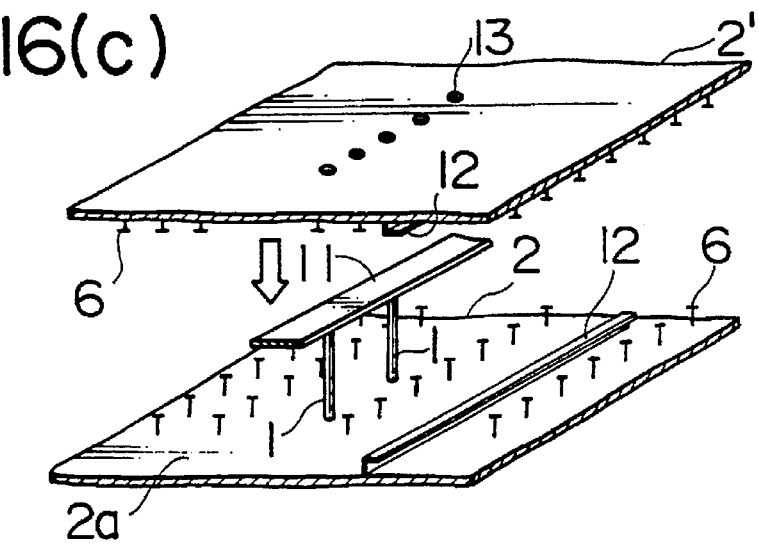
Figure 16D:
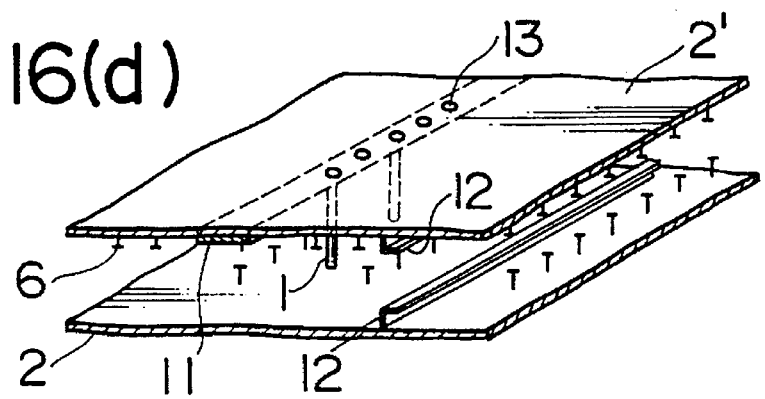

FIGS. 14 and 15 show embodiments where the wall structure described above is applied to the outer periphery and the internal periphery of a building, respectively. In FIG. 14, surface steel plates 2, 2' are connected with each other by connecting members 1, and stud bolts 6 are planted in a staggered arrangement within a specified range on the internal surfaces 2a and 2b of surface steel plates 2 and 2'. The floor construction comprises floor reinforcements 9 and concrete 10, and inverted U-shaped steel reinforcements 8 extend to the mounting portion. In FIG. 15, two surface steel plates 2 and 2' have the same shape, and the inverted U-shaped steel reinforcement also extends into the floor. The stud bolts 6, connecting members 1, and other components are mounted in the same manner.

In the following we will describe a procedure for constructing a steel plate structure used to manufacture a wall having such a construction as the one described above with reference to FIGS. 16a–16d.

First, connecting rods 1 are attached by welding to band steel 11 at predetermined intervals (FIG. 16 (a)). Next, to the inner surface 2a of one of the pair of surface steel plates 2 to which stud bolts 6 have already been planted in the arrangement described above, fixed by welding are the tip of the connecting rods 1 (FIG. 16 (b)). At this point, as shown in the figure, a band steel 11 is located in a position at a distance from one of the surface steel plates 2. A suitable rib 12 is attached to the surface steel plate 2 to secure stiffness during construction.

Next, the other surface steel plate 2' on which through holes have been drilled in advance at positions for connection with the band steel and the inner surface of which has stud bolts already disposed thereon is conveyed by a suspension crane which is not shown here so that the steel plate 2' approaches the band steel 11 from above (FIG. 16 (c)). In order to simplify the drawing, shown here are only one assembled unit containing the connecting rod 1 and the band steel 11, although it should be understood that a plurality of these is normally used. The other surface steel plate 2' is placed on top of the band steel 11, and then the surface steel plate 2' is connected with the band steel 11 by plug welding using the opening 13.

The wall is then completed when the steel plate construction, manufactured in this manner, is filled with concrete. Filling with concrete can be also done, either partially or in its entirety, at a plant or at a building construction site. What is important is to take into account the entire building in order to implement the most efficient method of construction.

Figure 17:
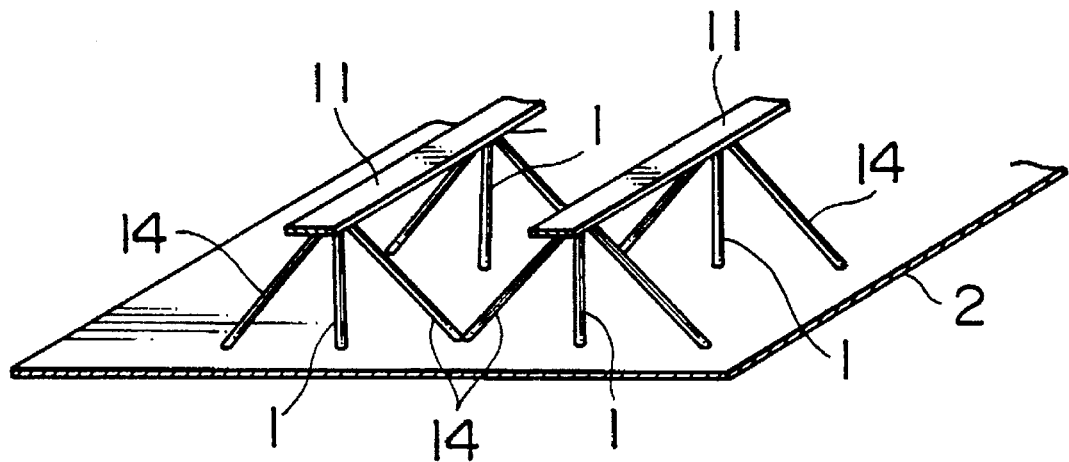
FIG. 17 is a perspective view showing one embodiment of the welding unit made of steel.

Although the method of manufacturing explained above uses only the band steel 11 and the connecting rod 1, as shown in FIG. 17, it is possible to increase the stiffness by disposing inclined supporting members 14 on both sides of the connecting rod 1.

Figure 18:
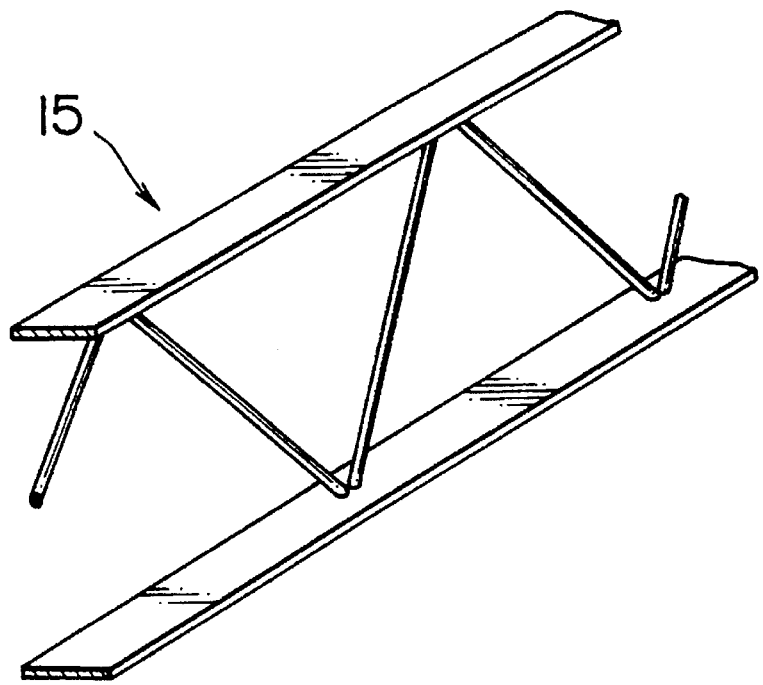
FIG. 18 is a perspective view showing another embodiment of the connecting member.
Figure 19:
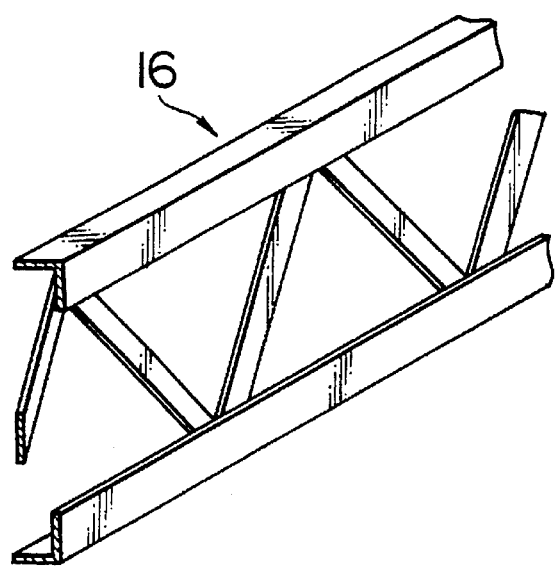
FIG. 19 is a perspective view showing another embodiment of the connecting member.
Figure 20:
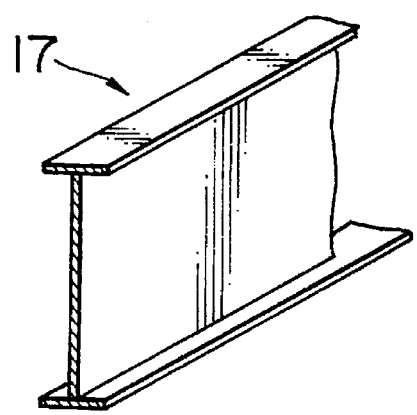
FIG. 20 is a perspective view showing still another embodiment of the connecting member.
Figure 21A:
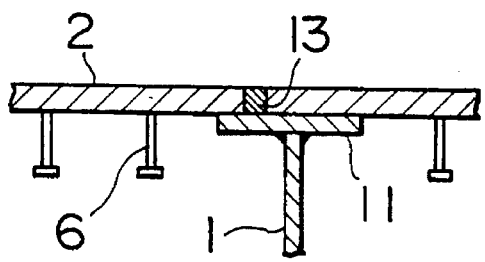
FIGS. 21(a) and (b) show a cross-sectional view of a connecting portion between the surface steel plate which has been mounted afterwards and the belt-shaped steel plate.
Figure 21B:
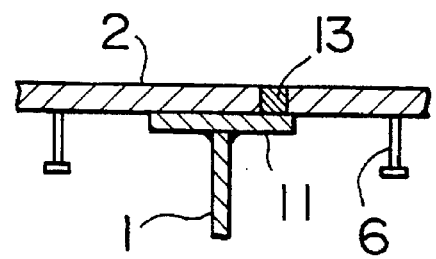

In addition, instead of the assembly unit with the band steel 11 and the connecting rod 1, it is also possible to use a truss-shaped assembly unit 15 (FIG. 18) and 16 (FIG. 19), or an I-shaped member 17 (FIG. 20). In any case, surface steel plates 2' having openings 13 are superposed onto band steel 11 or other equivalent members in the manner shown in FIG. 21. Consequently, even when the accuracy of positioning of the drilled openings 13 is somewhat poor, plug welding shown in FIGS. 21 (a) and (b) is still quite possible from the outer side, and compared to conventional methods, this method is not time consuming, while it is quite simple.

As explained above, according to the concrete-filled steal bearing wall of this invention, steel reinforcements for binding the wall body periphery are disposed at suitable intervals and with suitable lengths around the periphery of the wall body concrete filled in the space formed between a pair of the surface steel plates which are held together by connecting members so as to face each other and be in parallel with each other, thereby an earthquake resistant wall of the steel plate concrete structure are restrained with a simple construction.

Consequently, because it is possible to let the wall body concrete of this earthquake resistant concrete-filled steel bearing wall also bear some burden of shearing force exerted upon the inner surface of the wall, it is now possible to improve the strength of this composite structure. By the same token, it is also possible to reduce the thickness of wall surface steel plates and provide an economical concrete-filled steel bearing wall.

According to this invention, it is not necessary to reinforce or strengthen beam and pillars around walls unnecessarily, and this invention may even be applied to cases where no pillars and frames are used.

Also, the bar assembly of the U-shaped steel reinforcements can be done easily even at a construction site of a building since the inner part of the earthquake resistant wall structure of the concrete-filled steel bearing wall is empty before filled with concrete.

Furthermore, since as explained above, stud bolts are planted in a staggered pattern on the surface steel plates of the concrete-filled steel bearing wall, when compared to conventional grid arrangements of the stud bolts, it is possible to reduce the number of stud bolts approximately by half while retaining the same degree of resistance to buckling of the surface steel plates.

It should be also mentioned that as the number of these stud bolts is reduced, because the economic efficiency of the design is increased due to a reduced amount of steel material used and because the stud bolts are more sparsely arranged, not only is it possible to increase the ease of welding operations involving additional fixtures to the steel plates other than the stud bolts, but it is also possible to reduce the time required for construction of the steel plate units by cutting in half stud bolt welding operations. Bending caused by welding distortion due to the welding of the welding ends of the stud bolts to the surface steel plates is also reduced, which makes it possible to manufacture products with higher precision.

Also, as explained above, according to this invention, a connection unit made of steel is manufactured by connecting one end of a plurality of the connecting rods to a band-shaped steel member and by connecting the other end of the connecting bars to one of the pair of surface steel plates which face each other; and the band-shaped steel member of this unit is superposed and connected onto the other of the pair of surface steel plates by plug welding. Thus, because it is possible to do the work of connecting surface steel plates from the outside of these units in the concrete-filled steel bearing wall, work space between the surface plates becomes unnecessary, and the manufacture of concrete-filled steel bearing wall is possible regardless of their thickness or outside appearance.

Furthermore, since most welding operations can be done while the operator is looking down, this makes it possible to improve efficiency of operations-and quality of the product. For the welding of the band-shaped steel member of the connecting units made of steel to the later-installed surface steel plates having through holes for welding also, sufficient areas may be left for welding, and precision of manufacturing can be improved.

Finally, since according to this invention, the steel plate units are manufactured by connecting belt-shaped steel members (band steel) with surface steel plates at a final stage, it is possible to freely utilize stiffeners and similar material in the internal part of these steel plate units.

What is claimed is:

1. A method for constructing a concrete-filled steel bearing wall, said method comprising the steps of:

welding one end of a plurality of connecting rods on one surface of an elongated steel band, connecting free ends of said plurality of connecting rods to an inner surface of one steel plate so as to form a connecting steel unit, superposing another steel plate on a surface of said steel band of said connecting steel unit opposite to said one surface, connecting said another steel plate to said steel band by plug welding, and filling an internal space formed between said one steel plate and said another steel plate with concrete.

2. A method for constructing a concrete-filled steel bearing wall, said method comprising the steps of:

securing a plurality of stud bolts on one surface of two steel plates in a pattern of staggered rows to vertically offset stud bolts between adjacent rows in a triangular arrangement, welding one end of a plurality of connecting rods on one surface of an elongated steel band, connecting free ends of said plurality of connecting rods to an inner surface of one of said two steel plates so as to form a connecting steel unit, superposing the other of said two steel plates on a surface of said steel band of said connecting steel unit opposite to said one surface, connecting said other steel plate to said steel band by plug welding, and filling an internal space formed between said two steel plates with concrete.

\* \* \* \* \*